(12) United States Patent
Tanaka

(10) Patent No.: US 7,203,205 B2
(45) Date of Patent: Apr. 10, 2007

(54) POLLING DEVICE AND COMMUNICATION APPARATUS

(75) Inventor: Yuji Tanaka, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1085 days.

(21) Appl. No.: 10/271,794

(22) Filed: Oct. 17, 2002

(65) Prior Publication Data

US 2003/0133470 A1    Jul. 17, 2003

(30) Foreign Application Priority Data

Jan. 17, 2002    (JP) .............................. 2002-009234

(51) Int. Cl.
    *H04L 12/403*    (2006.01)
(52) U.S. Cl. ..................... 370/449; 710/44; 710/46
(58) Field of Classification Search ................ 710/44, 710/4, 34, 46; 370/346
    See application file for complete search history.

(56) References Cited

U.S. PATENT DOCUMENTS 6,119,194 A * 9/2000 Miranda et al. ............ 710/306
6,791,998 B1 * 9/2004 Yoshihara et al. .......... 370/449
2002/0116565 A1 * 8/2002 Wang et al. ................ 710/313

FOREIGN PATENT DOCUMENTS

JP    11-298477 A    10/1999

* cited by examiner

*Primary Examiner*—Hassan Kizou
*Assistant Examiner*—Brian Roberts
(74) *Attorney, Agent, or Firm*—Birch, Stewart, Kolach & Birch, LLP

(57) ABSTRACT

A polling device of the present invention performs communication control such that frame synchronous transfer modes and frame asynchronous transfer modes are used so as to perform a communication operation, and includes: a polling counter section for reading all communication channels for each address number; a state circuit for changing the order of priority in transfer each time the polling counter section counts one round of values after initializing the state circuit for each frame period; a latch section for latching a value of the polling counter section; and a matching detection section for comparing the value latched by the latch section with a value of the polling counter section, in which a polling operation is started from the value latched by the latch section at the time of initializing the state circuit for each frame period.

6 Claims, 7 Drawing Sheets

POLLING DEVICE AND COMMUNICATION APPARATUS

BACKGROUND OF THE INVENTION

1. Field of the Invention

The present invention relates to a polling device for performing communication control, which is applicable to, for example, a host control circuit used in a USB (Universal Serial Bus) system, and a communication apparatus using such a device.

2. Description of the Related Art

In recent years, there has been an increase in opportunity to process audio data, image data, and in particular, successively-moving streaming data, such as motion picture data, using digital equipment. In order to communicate such streaming data, it is necessary to always secure a specific frequency band in a communication path. As communication buses, which enable this, there are USB, IEEE1394, etc. In order to always secure a specific frequency band in a communication path, it is necessary to allow information, which should be communicated, to be allocated within a specific frame period. In a USB transfer method, such information is allocated within a frame period of 1 millisecond (msec) or less.

The mode for securing a specific frequency band in a bus, such as USB, so as to perform an information transfer over the secured frequency band is referred to as an "isochronous transfer". The transfer methods other than the USB transfer method, e.g., an IEEE1394 transfer method, etc., basically use substantially similar types of transfer modes to those used in the USB transfer method, and therefore descriptions of the variety of types of transfer modes are given only with respect to the case of the USB transfer method.

The USB can connect a host computer and a plurality of devices (up to 127 devices). An address number in the range from 0 to 127 is allocated to each device (address number (device number) 0 is used only immediately after connection), and each device can have up to 16 endpoints (corresponding to communication channels).

Firstly, the host computer divides the time into prescribed time periods referred to as "frames" (each frame corresponds to 1 msec in the case of the USB). The host computer transmits a SOF (Start of Frame) at the beginning of a frame, and then performs an isochronous transfer, as a transfer type, or an interrupt transfer having a length corresponding to n times the length of a frame period, where n is an integer. The isochronous transfer is performed in each frame, while the interrupt transfer is performed for each transfer time interval (hereinafter, referred to as the "interval"). Specifically, the interrupt transfer is performed while counting the number of frames using an interval counter.

Next, after one cycle of the isochronous transfer and/or one cycle of the interrupt transfer are/is performed, the other types of transfers, such as a control transfer of a command and a bulk transfer of data, are performed. The control transfer is preferably performed once per frame, and therefore only the bulk transfer is performed after one cycle of the control transfer is completed. Specifically, after commands are exchanged by the control transfer, units of data are exchanged by the bulk transfer. It should be noted that the isochronous transfer, the interrupt transfer, the control transfer, and the bulk transfer are performed from one of the four types of transfers having the highest priority in transfer.

Referring to FIG. 4, a structural example of a communication system, which realizes the above-described functions, is described.

FIG. 4 is a block diagram illustrating a primary structure of a conventional communication circuit 100. In FIG. 4, the communication circuit 100 includes a 1-millisecond counter (1 ms counter) 101, a controller 102, a polling circuit 103, a transmitter circuit 104, and a receiver circuit 105.

The 1 ms counter 101 counts a prescribed time period of 1 msec, which is a unit of a frame, so as to generate a 1 ms timer signal.

The controller 102 sets the types of transfers, a value of a transfer counter, a value of an interval counter, etc., which are described below with reference to FIG. 5. The interval counter generates a pulse signal for each time period having a length corresponding to n times the length of a prescribed time period of 1 msec, where n is an integer, so as to count the number of frames.

The polling circuit 103 determines the order of priority in transfer, determines whether or not preparations for communication are made, and then outputs a communication request (a transmission request).

The transmitter circuit 104 transmits a data signal to any other equipment 106 according to the transmission request.

The receiver circuit 105 receives a response from the other equipment 106 and sends a transmission completion signal to the polling circuit 103.

FIG. 5 is a block diagram illustrating a detailed structure of the polling circuit 103 shown in FIG. 4. FIG. 6 is a timing chart illustrating the operation of the polling circuit 103. In FIGS. 5 and 6, symbols for the types of transfers "IS", "IN", "C", and "B" denote an isochronous transfer, an interrupt transfer, a control transfer, and a bulk transfer, respectively.

Referring to FIGS. 5 and 6, when a value represented by a 1 ms timer signal output by the 1 ms counter 101 (FIG. 4) becomes "1", the 1 ms timer signal passes through an OR circuit to a flip flop in an output stage, so that a value represented by a communication request becomes "1", thereby transmitting a SOF (Start Of Frame). The 1 ms timer signal resets and clears a polling address counter and a polling endpoint counter so as to cause their respective values to become "0". Further, the 1 ms timer signal resets a state counter so as to cause a value of a state signal to become "00", and also resets a count-up signal generator circuit so as to cause a value of a count-up signal to become "0". Furthermore, although not shown in the figures, the interval counter is counted down so as to decrease its value by "1", and when the value of the interval counter is decreased to "0", the initial value thereof is loaded into the interval counter.

Next, when the transmission of the SOF is completed, the polling address counter and the polling endpoint counter are reset so as to have the irrespective values "0", as described above. Similarly, the value represented by the state signal output by the state counter becomes "00". At this point, the value represented by the count-up signal becomes "1".

The polling endpoint counter has four endpoint (communication channel) numbers from "0" to "3". In the case where the count-up signal represents the value "1", when a clock signal is input to the polling endpoint counter, the polling endpoint counter is counted up so as to increase its value by "1". As a result, the endpoint number is sequentially changed from "0" through "1" to "2" with inputs of clock signals, and when the endpoint number becomes "3", a "=3" detection section detects the value "3". When the next clock signal is input to the polling endpoint counter, the endpoint number returns to "0".

On the other hand, the polling address counter has three values from "0" to "2". In the case where the polling endpoint counter has the value "3", when the next clock signal is input to the polling address counter, the address number is counted up by "1". When the address number becomes "2", a "=2" detection section detects the value "2". When the next clock signal is input to the polling address counter, the address number returns to "0".

Types of transfers to be performed at endpoints, values of a transfer number counter, and values of an interval counter, which are indicated by the polling address counter and the polling endpoint counter, are read by corresponding registers (not shown) in the polling circuit 103. In the case where the state counter has the value "00", it is determined whether the isochronous transfer should be performed or whether the interrupt transfer should be performed at the time the interval counter has the value "0". This determination operation is performed based on the state of an output of a logic circuit which is a determination circuit (including a "=0" detection section, two matching detection circuits, an AND circuit, and an OR circuit). While reading the types of transfers, the values of the transfer number counter and the values of the interval counter, the value represented by the count-up signal is required to be "0", so as not to count up the polling address counter and the polling endpoint counter.

When the value represented by a state signal output by the state counter is "00", a value represented by a communication request is caused to be "1" so as to perform a transfer operation. When the communication is completed, a value represented by a communication completion signal becomes "1", and the value represented by the communication request returns to "0". When the value represented by the state signal is not "00" or when the communication is completed, the polling address counter and the polling endpoint counter are counted up so as to increase their respective values by "1". When all of the address numbers and the endpoints are checked, the state counter is counted up so as to cause the value represented by the state signal to become "01".

When the value represented by the state signal output by the state counter is "01", the types of transfers to be performed at endpoints, values of the transfer number counter, and values of the interval counter, which are indicated by the polling address counter and the polling endpoint counter, are read by the corresponding registers (not shown) in the polling circuit 103 so as to find a control transfer or a bulk transfer which should be performed at the time the value of the transfer number counter is not "0". This operation is performed based on the state of an output of a logic circuit which is a determination circuit (including two matching detection circuits, an OR circuit, a "≠0" detection section, and an AND circuit).

When the control transfer or the bulk transfer is found, the value represented by the communication request is caused to be "1" so as to perform a transfer operation. When the communication is completed, the value represented by the communication completion signal becomes "1", and the value represented by the communication request returns to "0".

Alternatively, when the control transfer or the bulk transfer is not found or when the communication is completed, the polling address counter and the polling endpoint counter are counted up so as to increase their respective values by "1". When all of the address numbers and the endpoints are checked, the state counter is counted up so as to cause the value represented by the state signal to become "10".

Further, when the value represented by the state signal output by the state counter is "10", the types of transfers to be performed at endpoints, values of the transfer number counter, and values of the interval counter, which are indicated by the polling address counter and the polling endpoint counter, are read by the corresponding registers in the polling circuit 103 so as to find a control transfer which should be performed at the time the value of the transfer number counter is not "0". This operation is performed based on the state of an output of a logic circuit which is a determination circuit (including two matching detection circuits, an OR circuit, a "≠0" detection section, and an AND circuit).

When the bulk transfer is found, the value represented by the communication request is caused to be "1" so as to perform a transfer operation. When the communication is completed, the value represented by a communication completion signal becomes "1" so as to perform a transfer operation and the value represented by the communication request returns to "0".

Alternatively, when the bulk transfer is not found or when the communication is completed, the polling address counter and the polling endpoint counter are counted up so as to increase their respective values by "1". After this, the state signal retains the value "10" (which is the maximum value for the USB). The same operation is repeated until the next 1 ms timer signal is generated.

As described above, when the state signal output by the state counter represents the value "00", which indicates the highest priority in transfer, an isochronous transfer or an interrupt transfer is performed. Then, transfer operations are processed in the order of priority based on values represented by state signals, such that a transfer operation corresponding to a state signal representing the value "01" is performed first and a transfer operation corresponding to a state signal representing the value "10" is performed last.

In the above-described structure, when the number of devices (to which address numbers are assigned as device numbers) is increased and transfer operations are performed more frequently, the next frame might be started during transmission of a state signal, which represents, for example, the value "01" having the second highest priority in transfer after the value "00" (a signal is compulsorily input for each millisecond in the case of the USB). In the case of a transfer operation corresponding to a state signal having a low priority in transfer, there is the possibility that a transfer operation might never be performed at a specific endpoint (corresponding to a communication channel). Specifically, this could happen in the case where ten devices connected to a communication system substantially simultaneously transmit interrupt transfer requests to the communication system.

A specific example is further provided. As shown in FIG. 6, after the isochronous transfer or the interrupt transfer is performed, the value represented by the state signal becomes "01" and a control transfer or a bulk transfer is started from the endpoint "0" at the address number "0". When the state where the next frame is started after a transfer operation on the endpoint "2" at the address number "1" is repeatedly created, transfer processing associated with the address number "1", the endpoint "3", and all the endpoints at the address number "2" might never be performed.

The USB standard does not permit the occurrence of the case where frequent performances of the isochronous transfer and/or the interrupt transfer cause the next frame to be started during the transmission of a state signal of the state counter, which represents the value "00" having the highest priority in transfer. Examples of such a case include a case where the sound being reproduced is interrupted by the input of a great deal of audio data to a device reproducing the sound. In the case where there is a possibility of such interruption, when a device is connected to a host computer, the host computer may cause the device to be disabled. However, there is a problem that it is unpredictable when the interrupt transfer occurs. Further, there is another problem that a specific frequency band in a communication path is required to be secured.

SUMMARY OF THE INVENTION

According to one aspect of the present invention, there is provided a polling device for performing communication control such that one or more frame synchronous transfer modes and one or more frame asynchronous transfer modes are used so as to perform a communication operation based on the order of priority in transfer which is set among all the transfer modes for each frame period, the device including: a polling counter section for sequentially reading all communication channels for each address number; a state circuit for sequentially changing the order of priority in transfer each time the polling counter section counts one round of values after initializing the state circuit for each frame period; a latch section for latching a value of the polling counter section for each frame period; and a matching detection section for comparing the value latched by the latch section with a value of the polling counter section, in which a polling operation is started from the value latched by the latch section at the time of initializing the state circuit for each frame period.

According to another aspect of the present invention, there is provided a polling device for performing communication control such that one or more frame synchronous transfer modes and one or more frame asynchronous transfer modes are used so as to perform a communication operation based on the order of priority in transfer which is set among all the transfer modes for each frame period, the device including: a polling counter section for sequentially reading all communication channels for each address number: a state circuit for sequentially changing the order of priority in transfer each time the polling counter section counts one round of values after initializing the state circuit for each frame period; a latch section for latching a value of the polling counter section for each frame period; and a matching detection section for comparing the value latched by the latch section with a value of the polling counter section, in which an initialization operation, which is performed on the polling counter section and the state circuit for each frame period, is suspended until the comparison performed by the matching detection section results in a match, and the suspension of the initialization operation is removed when the comparison performed by the matching detection section results in a match.

In one embodiment of the invention, the polling device further includes: a register section for storing transfer mode information for each communication channel; and a counter section capable of sequentially outputting information about the number of units of transfer data and a transfer interval for each communication channel, in which the device reads information corresponding to each communication channel, which includes a transfer type, the number of units of transfer data, and a transfer interval, so as to check, as preparations for communication, whether or not the read information is prescribed data for a specific communication channel.

According to still another aspect of the present invention, there is provided a communication apparatus including a polling device according to the second aspect of the present invention, in which when it is determined that the preparations are made, the device performs data communication; and when it is determined that the preparations are not made and the data communication is completed, the communication apparatus controls communication so as to cause the device to terminate a polling operation on a current communication channel and restart the polling channel on the next communication channel.

In the case where the above structure is used for performing communication using a plurality of transfer modes at different levels of priority in transfer, it is necessary to change the order of priority in transfer after all of addresses and information about all of communication channels are completely checked. According to the present invention, a value of the polling counter section is latched for each frame and is compared with a value of the polling counter section. When the comparison results in a match, it is possible to determine that all of the addresses and all of communication channels are completely checked. By starting a polling operation from a value latched by the latch section at the time of initializing the state circuit for each frame period or by canceling a reset operation on the state circuit when the latched value and a value of the polling counter section are detected to be matched to each other, it is possible to prevent the possibility that a transfer operation might never be performed on a channel having a low priority in transfer. Therefore, it is possible to control communication so as to equally perform a frame synchronous transfer mode and a frame asynchronous transfer mode, thereby preventing any data transfer from being left unperformed.

Thus, the invention described herein makes possible the advantage of providing a polling device for controlling communication so as to prevent any data transfer from being left unperformed, and a communication apparatus using such a device.

This and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of a communication apparatus according to the present invention will be described with reference to the drawings.

Figure 1:
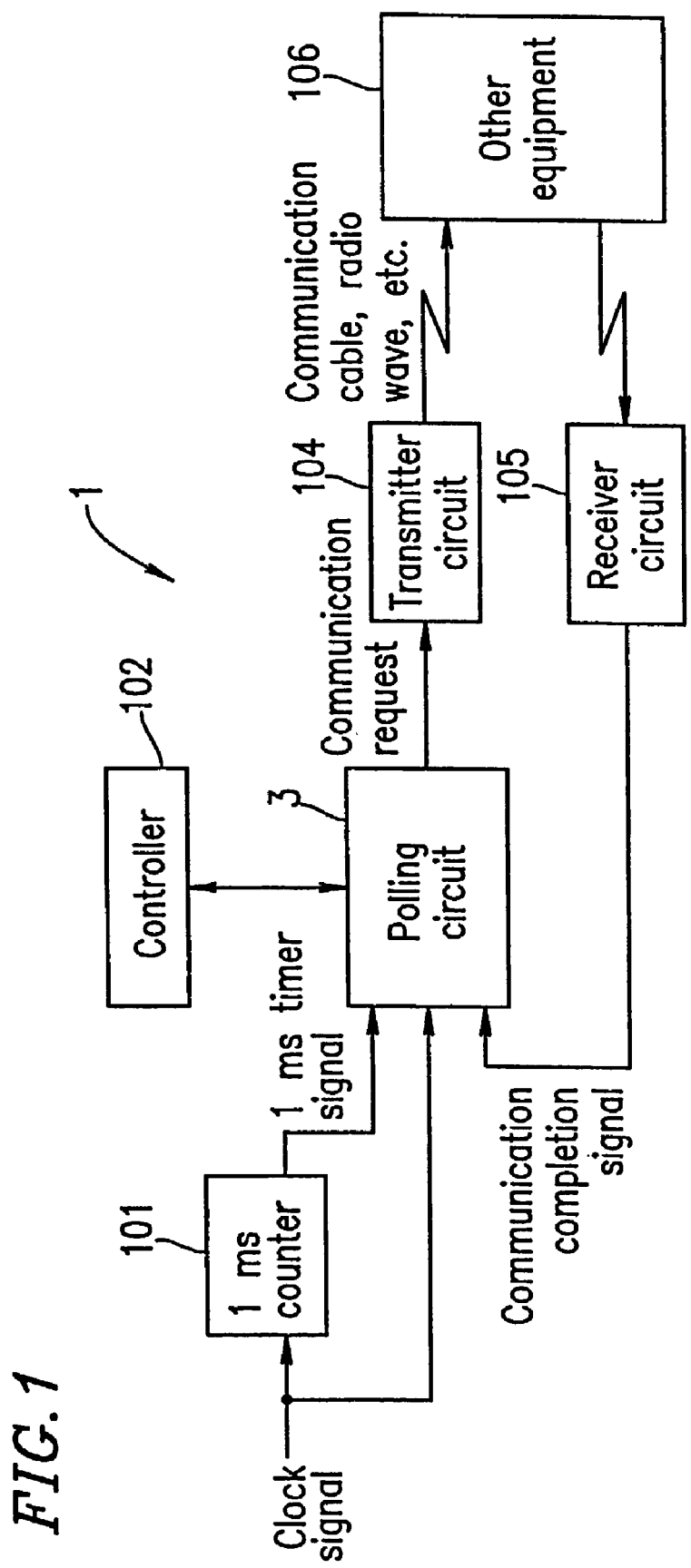
FIG. 1 is a block diagram illustrating a primary structure of a communication apparatus according to an embodiment of the present invention.
Figure 4:
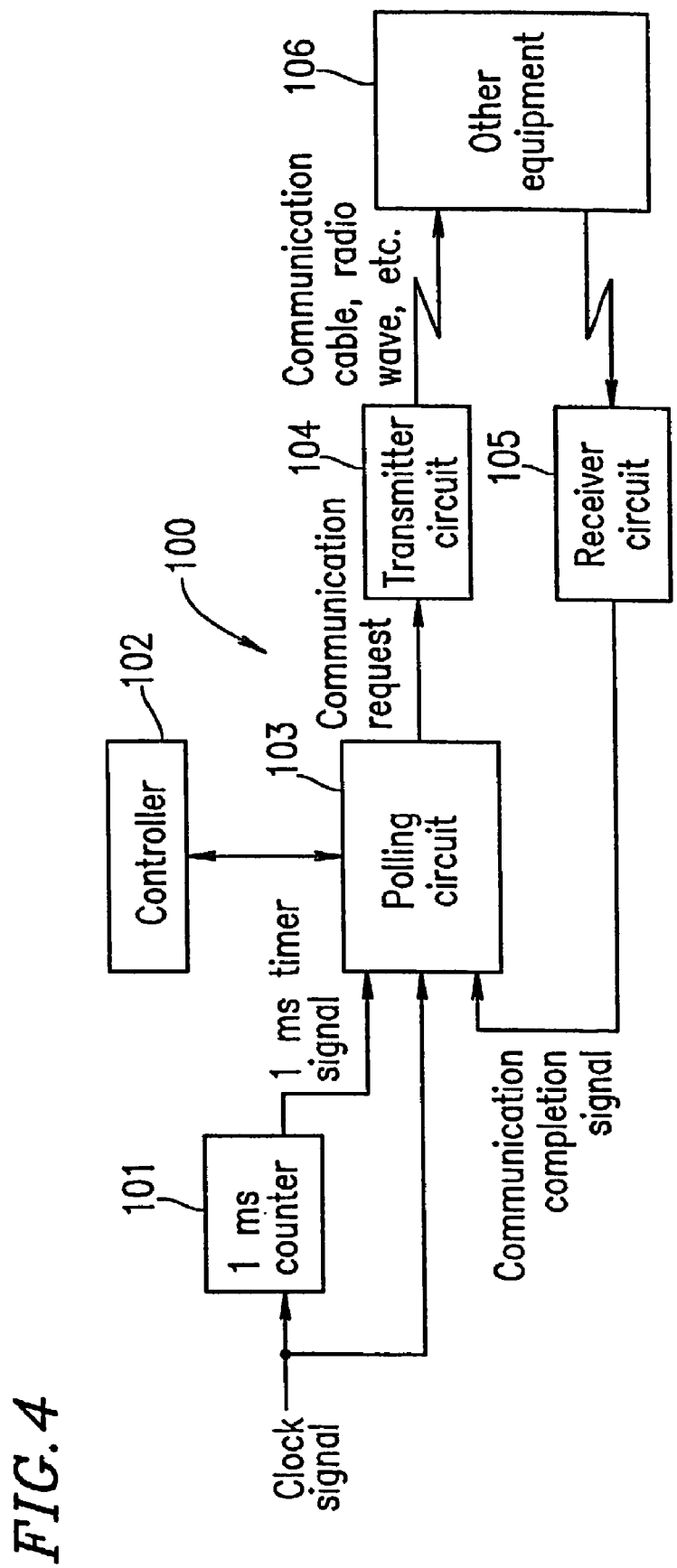
FIG. 4 is a block diagram illustrating a primary structure of a conventional communication apparatus.
Figure 5:
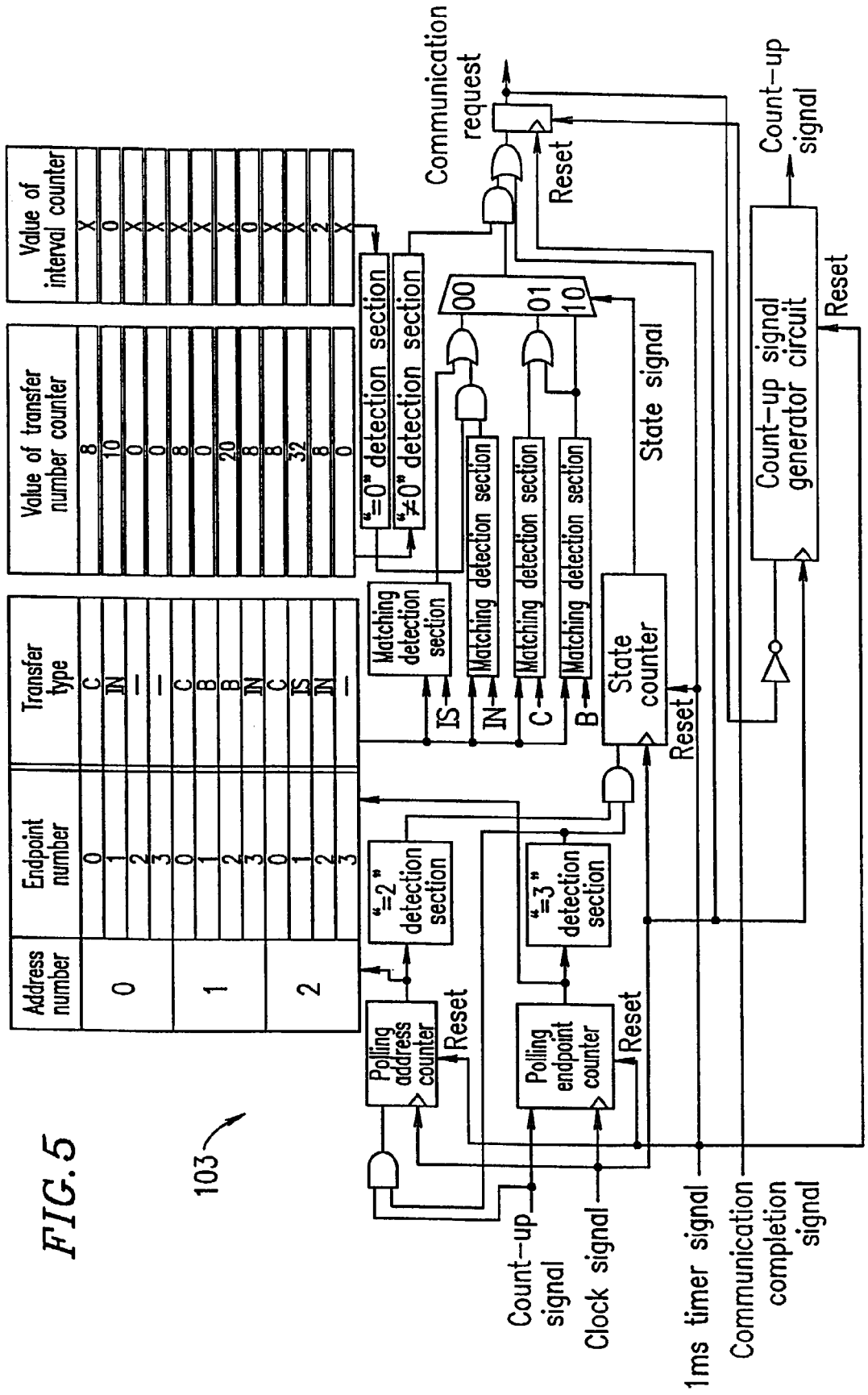
FIG. 5 is a block diagram illustrating a detailed structure of a polling circuit shown in FIG. 4.
Figure 6:
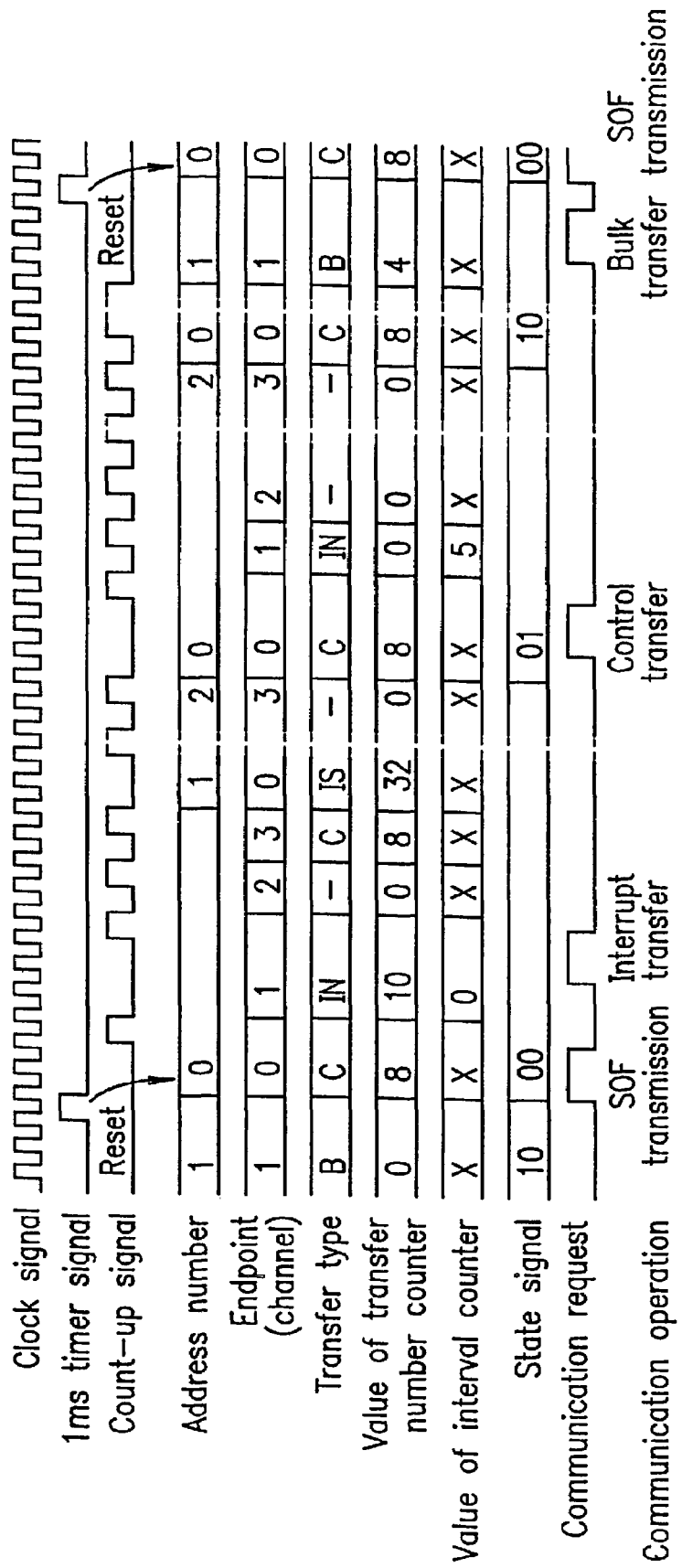
FIG. 6 is a timing chart illustrating the operation of the polling circuit shown in FIG. 4.
Figure 7:
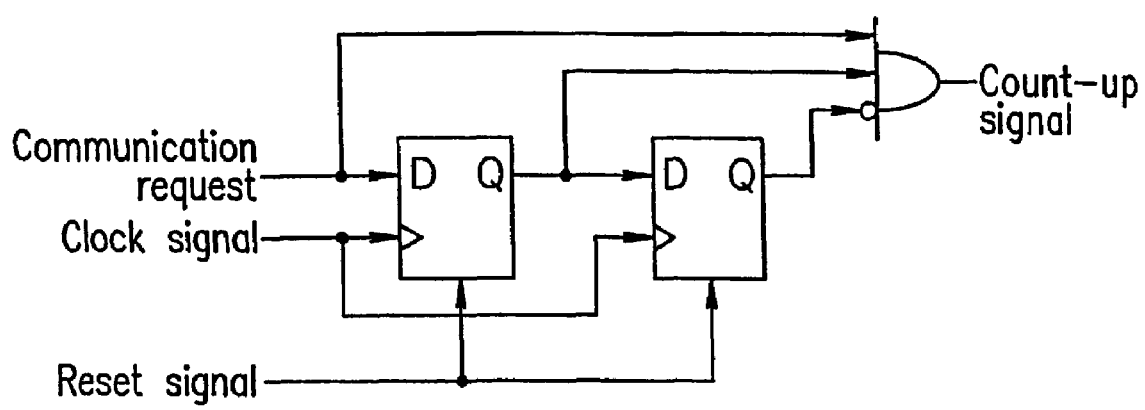
FIG. 7 is a circuit diagram illustrating a specific example of a count-up signal generator circuit shown in FIG. 1.

FIG. 1 is a block diagram illustrating a primary structure of a communication apparatus according to an embodiment of the present invention. In FIG. 1, elements having similar effects to those of elements shown in FIG. 4 are denoted by similar reference numerals, and therefore descriptions thereof are omitted.

In FIG. 1, a communication circuit 1 includes: a 1 ms counter 101; a controller 102; a polling circuit 3 for determining the order of priority in transfer and determining whether or not preparations for communication are made, so as to output a communication request (a transmission request); a transmitter circuit 164; and a receiver circuit 105. When it is determined that the preparations for communication are made, the communication circuit 1 performs data communication. When it is not determined that the preparations for communication are made and/or when data communication is completed, the communication circuit 1 performs communication control on the polling circuit 3 so as to restart a polling operation on the next communication channel.

Figure 2:
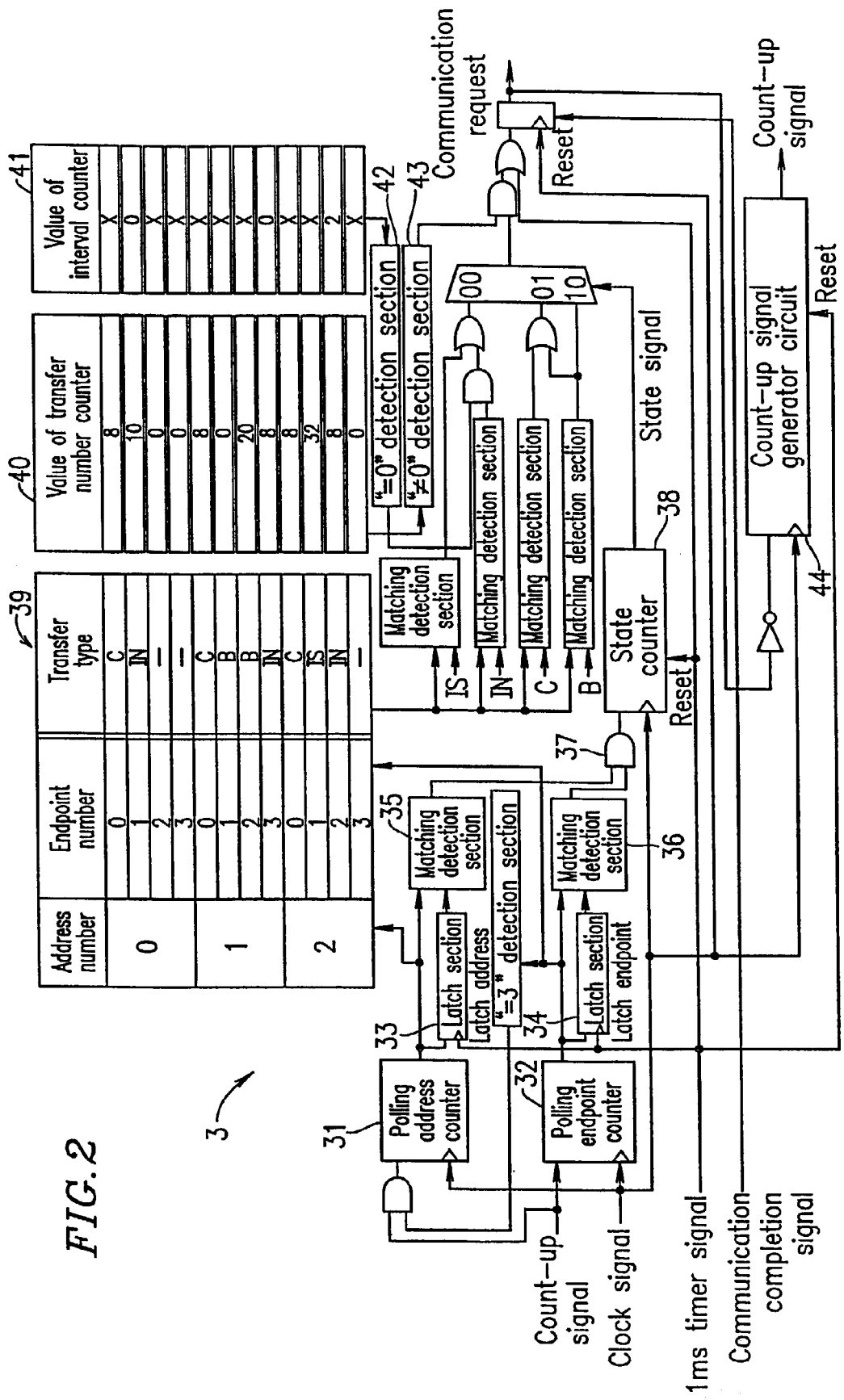
FIG. 2 is a block diagram illustrating a detailed structure of a polling circuit shown in FIG. 1.

FIG. 2 is a block diagram illustrating a detailed structure of the polling circuit 3 shown in FIG. 1. In FIG. 2, the polling circuit 3 includes: a polling address counter 31 and a polling endpoint counter 32 (correctively referred to as a "polling counter section") for sequentially reading all of the communication channels (endpoint numbers) for each address number; a state counter 38 as a state circuit for sequentially changing the order of priority ("00", "01", and "10") each time the polling counter section counts one round of values after the state counter 38 is initialized for each frame period; a latch section 33 for latching a value of the polling address counter 31 for each frame period; a matching detection section 35 for comparing the value latched by the latch section 33 with a value of the polling address counter 31; a latch section 34 for latching a value of the polling endpoint counter 32 for each frame period; a matching detection section 36 for comparing the value latched by the latch section 34 with a value of the polling endpoint counter 32; and an AND circuit 37 for receiving the respective outputs of the matching detection sections 35 and 36 at a corresponding one of the inputs thereof. The polling address counter 31 and the polling endpoint counter 32, which are used for determining an address number and a communication channel, are not initialized in a frame period. The latest values of the polling address counter 31 and the polling endpoint counter 32 (an address number and an endpoint number) at one frame before the initialization are respectively stored (latched) in the latch sections 33 and 34. At the time of initializing the state counter 38 for each frame period, a polling operation is started from each of the values latched by the latch sections 33 and 34.

The polling circuit 3 also includes a register 39 for storing transfer mode information about each communication channel, a transfer number counter 40 capable of sequentially outputting information about the number of units of transfer data for each communication channel, and an interval counter 41 capable of sequentially outputting information about a transfer interval for each communication channel. The polling circuit 3 reads information corresponding to each communication channel, which includes a transfer type, the number of units of transfer data, and a transfer interval which are from the register 39, the transfer number counter 40, and the transfer interval counter 41, respectively. The polling circuit 3 checks, as preparations for communication, whether or not the read information is prescribed data for a specific communication channel. In the case where the read information is determined to be the prescribed data for the specific communication channel, the polling circuit 3 outputs a communication request.

Figure 3:
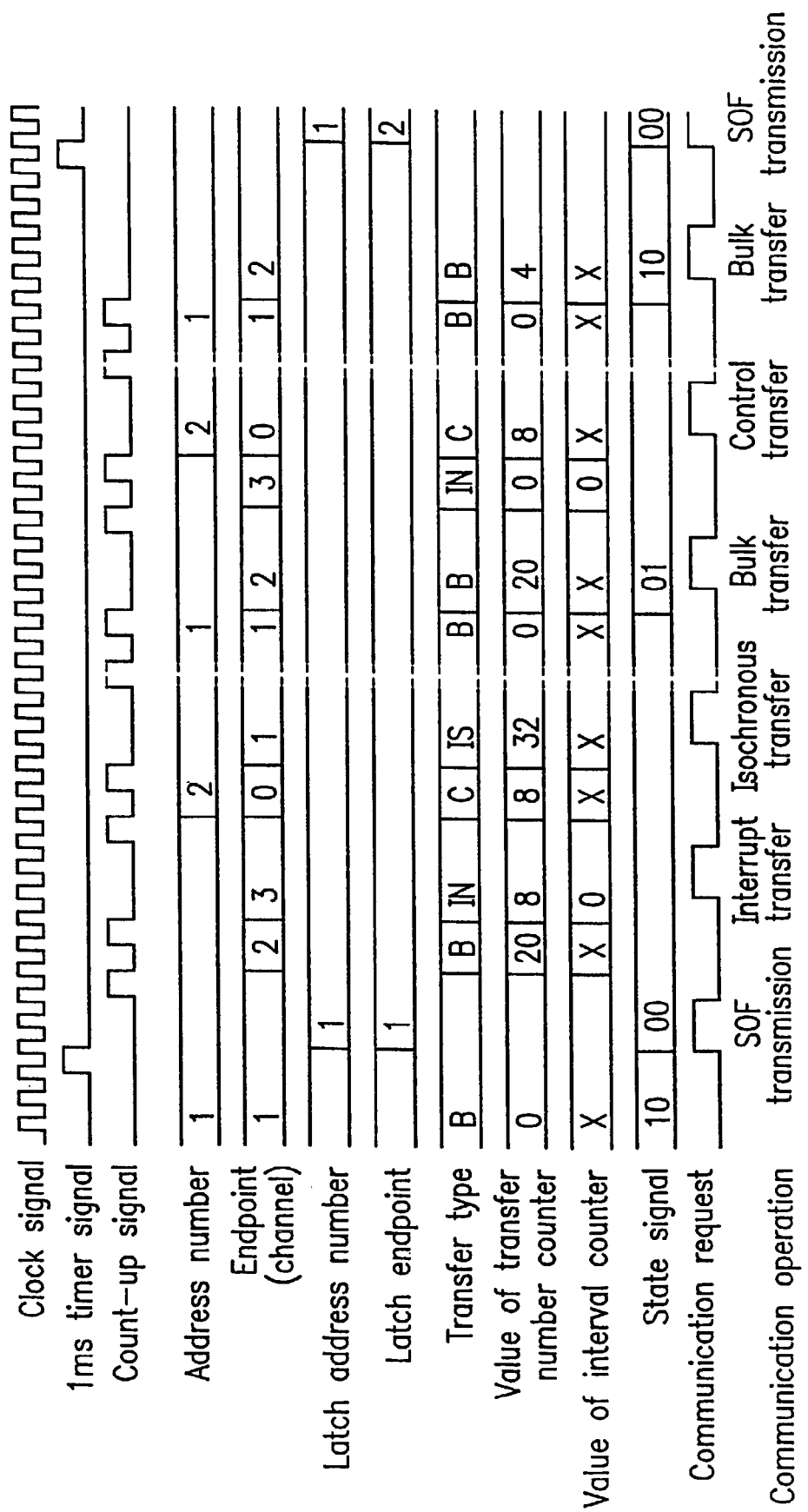
FIG. 3 is a timing chart illustrating the operation of the polling circuit shown in FIG. 1.

FIG. 3 is a timing chart illustrating the operation of the polling circuit 3 shown in FIG. 1.

Referring to FIGS. 2 and 3, when a value represented by a 1 ms timer signal becomes "1" so that the 1 ms timer signal is brought into an ON state, a value of a communication request also becomes "1" so that the communication request is brought into an ON state. As a result, a SOF is transmitted from an OR circuit through a flip flop. Values of the polling address counter 31 and the polling endpoint counter 32 are respectively stored in the latch sections 33 and 34. Further, the 1 ms timer signal resets the state counter 38 so as to cause a value represented by a state signal to become "00" and also resets the count-up signal generator circuit 44 so as to cause a value represented by a count-up signal to become "0". Furthermore, although not shown in the figures, the interval counter 41 is counted down so as to decrease its value by "1". When the value of the interval counter 41 becomes "0", the initial value thereof is loaded into the interval counter 41.

Next, after the transmission of the SOF is completed, a state signal represents the value "00" indicating the highest priority in transfer. Therefore, the polling circuit 3 reads types of transfers to be performed at endpoints (corresponding to communication channels), values of the transfer number counter 40, and the value of the interval counter 41, which are indicated by the polling address counter 31 and the polling end point counter 32, so as to find an isochronous transfer IS or an interrupt transfer IN which should be performed at the time the interval counter 41 has the value "0". This operation can be performed based on the state of a gate output of a determination circuit (including a "=0" detection section 42, two matching detection sections, an AND circuit, and an OR circuit).

When the isochronous transfer IS or the interrupt transfer IN is found, the value represented by the communication request is caused to be "1" so as to perform a transfer operation. When a communication is completed, a value represented by the communication completion signal becomes "1", and the value represented by the communication request returns to "0".

Alternatively, when the isochronous transfer IS or the interrupt transfer IN is not found or when the communication is completed, the polling address counter 31 and the polling endpoint counter 32 are counted up so as to increase their respective values by "1".

Further, the matching detection section 35 compares the value of the polling address counter 31 with a value stored in the latch section 33, and the matching detection section 36 compares the value of the polling endpoint counter 32 with a value stored in the latch section 34. When the comparison made by each of the matching detection sections 35 and 36 results in a match, it is possible to determine that all of the address numbers and endpoints are completely checked, based on the state of an output of the AND circuit 37 receiving outputs of the matching detection sections 35 and 36.

When all of the address numbers and endpoints are completely checked, the state counter 38 receives the output from the AND circuit 37 and is counted up in synchronization with a clock signal so as to cause the value of the state signal to become "01".

When the state signal represents the value "01", the polling circuit 3 reads types of transfers to be performed at endpoints, values of the transfer number counter 40, and values of the interval counter 41, which are indicated by the polling address counter 31 and the polling endpoint counter 32, so as to find a "control transfer C" or a "bulk transfer B", which should be performed at the time the transfer number counter 40 does not have the value "0". This operation can be performed based on the state of a gate output of a determination circuit (including a "≠0" detection section 43, two matching detection sections, an OR circuit, and an AND circuit).

When the "control transfer C" or the "bulk transfer B" is found, a value represented by a communication request is caused to be "1" so as to perform a transfer operation. When the communication is completed, a value represented by a communication completion signal becomes "1", and the value represented by the communication request returns to "0".

Alternatively, when the "control transfer C" or the "bulk transfer B" is not found or when the communication is completed, the polling address counter 31 and the polling endpoint counter 32 are counted up so as to increase their respective values by "1".

Further, the matching detection section 35 compares a value of the polling address counter 31 with a value stored in the latch section 33, and the matching detection section 36 compares a value of the polling endpoint counter 32 with a value stored in the latch section 34. When the comparison made by each of the matching detection sections 35 and 36 results in a match, it is possible to determine that all of address numbers and endpoints are completely checked, based on the state of an output of the AND circuit 37 receiving outputs of the matching detection sections 35 and 36.

When all of the address numbers and endpoints are completely checked, the state counter 38 receives the output from the AND circuit 37 and is counted up in synchronization with a clock signal so as to cause a value represented by a state signal to become "10".

When the state signal represents the value "10", the polling circuit 3 reads the types of transfers to be performed at the endpoints, the values of the transfer number counter 40, and the values of the interval counter 41, which are indicated by the polling address counter 31 and the polling end point counter 32, so as to find a bulk transfer which should be performed at the time the transfer number counter 40 does not have the value "0". This operation can be performed based on the state of a gate output of a determination circuit (including a "≠0" detection section 43, one matching detection section, and an AND circuit).

When such a bulk transfer is found, a value represented by the communication request is caused to be "1" so as to perform a transfer operation. When the communication is completed, a value represented by the communication completion signal becomes "1", and the value represented by the communication request returns to "0".

Alternatively, when the bulk transfer is not found or when the communication is completed, the polling address counter 31 and the polling endpoint counter 32 are counted up so as to increase the irrespective values by "1". After this, the state counter 38 retains the value "10", and the same operation is repeated until the next 1 ms timer signal is generated.

As described above, according to the present invention, in a polling device for performing communication control such that one or more frame synchronous transfer modes, such as isochronous and interrupt transfers, and one or more frame asynchronous transfer modes, such as control and bulk transfers, are used so as to perform a communication operation based on the order of priority in transfer, which is set among all the transfer modes (and is changed)for each prescribed time period (frame period), the polling address counter 31 and the polling endpoint counter 32, which are used for determining address numbers and communication channels, are not initialized in a frame period. The latest values of the polling address counter 31 and the polling endpoint counter 32 (an address number and an endpoint number) at one frame before the initialization are respectively stored (latched) in the latch sections 33 and 34. By starting a polling operation from the stored value at the time of initializing the state counter 38, it is possible to prevent the possibility that a transfer operation might never be performed on a specific channel, e.g., a channel having a low priority in transfer, and it is also possible to schedule a transfer operation so as to equally transfer data over each channel, thereby preventing any data transfer from being left unperformed.

In order to prevent any data transfer from being unperformed, the above-described embodiment is configured so as to start a polling operation from values latched by the latch sections 33 and 34 at the time of the initialization for each frame period. However, the present invention is not limited to this. A polling device of the present invention can be configured such that the polling circuit 3 includes: the polling address counter 31 and the polling endpoint counter 32 (the polling counter section) for sequentially reading all of the communication channels (endpoint numbers) for each address number; a state counter 38 as a state circuit for sequentially changing the order of priority ("00", "01", and "10") each time the polling counter section counts one round of values after the state counter 38 is initialized for each frame period; the latch section 33 for latching a value of the polling address counter 31 for each frame period; a matching detection section 35 for comparing the value latched by the latch section 33 with a value of the polling address counter 31; the latch section 34 for latching a value of the polling endpoint counter 32 for each frame period; the matching detection section 36 for comparing the value latched by the latch section 34 with a value of the polling endpoint counter 32; and an AND circuit 37 for receiving the respective outputs of the matching detection sections 35 and 36 at a corresponding one of inputs thereof. In this case, the polling address counter 31, the polling endpoint counter 32, and the state counter 38 are not initialized in each frame period until the comparison made by each of the matching detection sections 35 and 36 results in a match, i.e., the polling address counter 31, the polling endpoint counter 32, and the state counter 38 can be initialized when the matching detection sections 35 and 36 individually detect the matched values.

Further, although not described as a specific example in the above embodiment, the count-up signal generator circuit 44 can be a series circuit including two data flip flops and an AND circuit.

As described above, according to the present invention, in the case of performing communication using a plurality of transfer modes, which include one or more frame synchronous transfer modes and one or more frame asynchronous transfer modes and have different levels of priority in transfer, by adding a few circuits to a polling counter section, it is possible to equally schedule a frame asynchronous transfer having a low priority after performing a frame synchronous transfer having a high priority in transfer, thereby preventing any data transfer from being unperformed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polling device for performing communication control such that one or more frame synchronous transfer modes and one or more frame asynchronous transfer modes are used so as to perform a communication operation based on the order of priority in transfer which is set among all the transfer modes for each frame period, the device comprising:
   a polling counter section for sequentially reading all communication channels for each address number;
   a state circuit for sequentially changing the order of priority in transfer each time the polling counter section counts one round of values after initializing the state circuit for each frame period;
   a latch section for latching a value of the polling counter section for each frame period; and
   a matching detection section for comparing the value latched by the latch section with a value of the polling counter section,
   wherein a polling operation is started from the value latched by the latch section at the time of initializing the state circuit for each frame period.

2. A polling device according to claim 1, further comprising:
   a register section for storing transfer mode information for each communication channel; and
   a counter section capable of sequentially outputting information about the number of units of transfer data and a transfer interval for each communication channel,
   wherein the device reads information corresponding to each communication channel, which includes a transfer type, the number of units of transfer data, and a transfer interval, so as to check, as preparations for communication, whether or not the read information is prescribed data for a specific communication channel.

3. A communication apparatus comprising a polling device of claim 2, wherein:
   when it is determined that the preparations are made, the device performs data communication; and
   when it is determined that the preparations are not made and the data communication is completed, the communication apparatus controls communication so as to cause the device to terminate a polling operation on a current communication channel and restart the polling channel on the next communication channel.

4. A polling device for performing communication control such that one or more frame synchronous transfer modes and one or more frame asynchronous transfer modes are used so as to perform a communication operation based on the order of priority in transfer which is set among all the transfer modes for each frame period, the device comprising:
   a polling counter section for sequentially reading all communication channels for each address number;
   a state circuit for sequentially changing the order of priority in transfer each time the polling counter section counts one round of values after initializing the state circuit for each frame period;
   a latch section for latching a value of the polling counter section for each frame period; and
   a matching detection section for comparing the value latched by the latch section with a value of the polling counter section,
   wherein an initialization operation, which is performed on the polling counter section and the state circuit for each frame period, is suspended until the comparison performed by the matching detection section results in a match, and the suspension of the initialization operation is removed when the comparison performed by the matching detection section results in a match.

5. A polling device according to claim 4, further comprising:
   a register section for storing transfer mode information for each communication channel; and
   a counter section capable of sequentially outputting information about the number of units of transfer data and a transfer interval for each communication channel,
   wherein the device reads information corresponding to each communication channel, which includes a transfer type, the number of units of transfer data, and a transfer interval, so as to check, as preparations for communication, whether or not the read information is prescribed data for a specific communication channel.

6. A communication apparatus comprising a polling device of claim 5, wherein:
   when it is determined that the preparations are made, the device performs data communication; and
   when it is determined that the preparations are not made and the data communication is completed, the communication apparatus controls communication so as to cause the device to terminate a polling operation on a current communication channel and restart the polling channel on the next communication channel.

* * * * *